Figure 1:
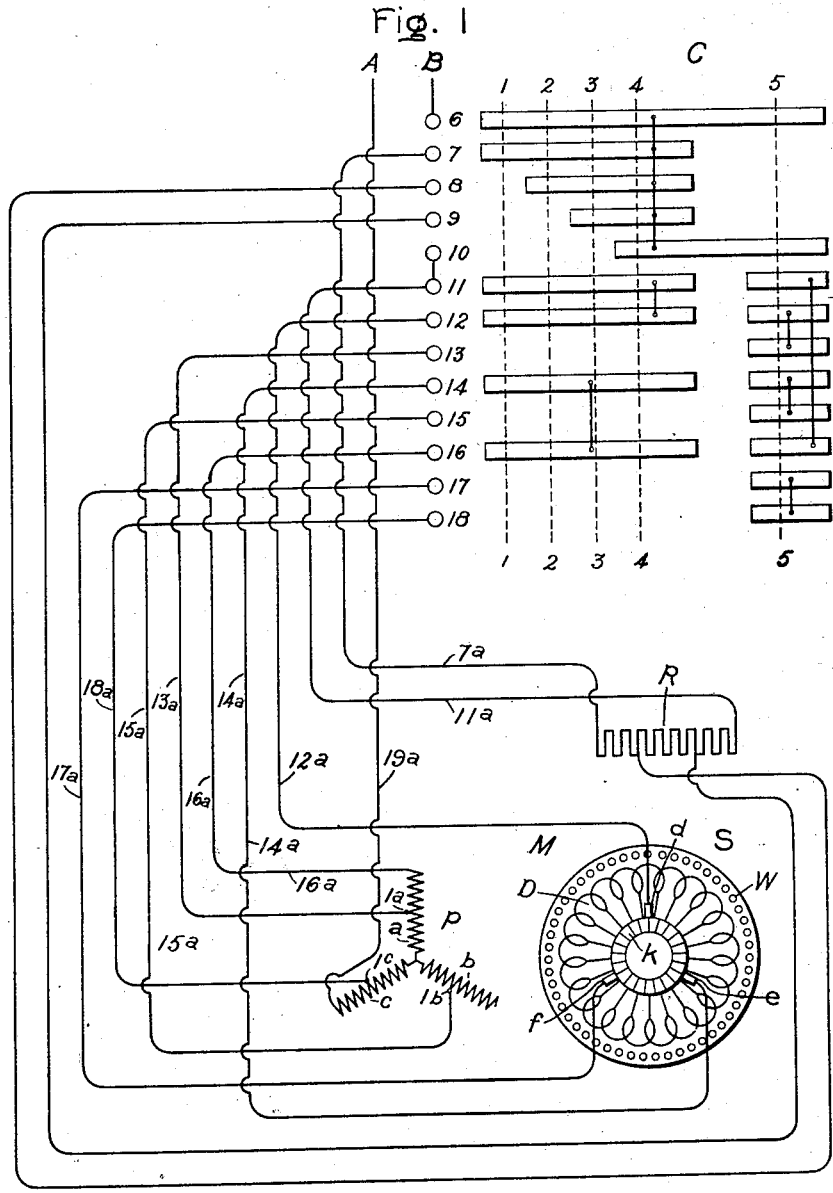

No. 729,441. PATENTED MAY 26, 1903.
C. P. STEINMETZ.
ALTERNATING CURRENT MOTOR.
APPLICATION FILED FEB. 12, 1903.
NO MODEL. 2 SHEETS—SHEET 1.

Witnesses.
George H. Tilden.
Helen Orford

Inventor.
Charles P. Steinmetz
by Albert G. Davis
Att'y.

No. 729,441. PATENTED MAY 26, 1903.
C. P. STEINMETZ.
ALTERNATING CURRENT MOTOR.
APPLICATION FILED FEB. 12, 1903.
NO MODEL. 2 SHEETS—SHEET 2.
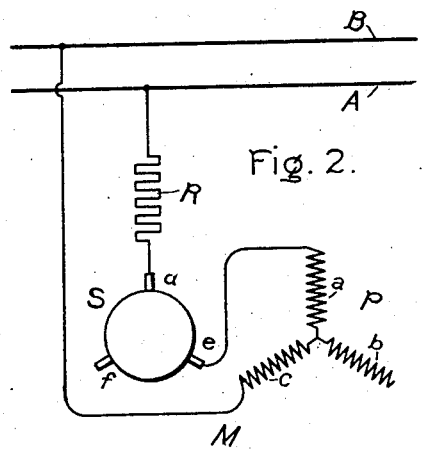
Fig. 2.
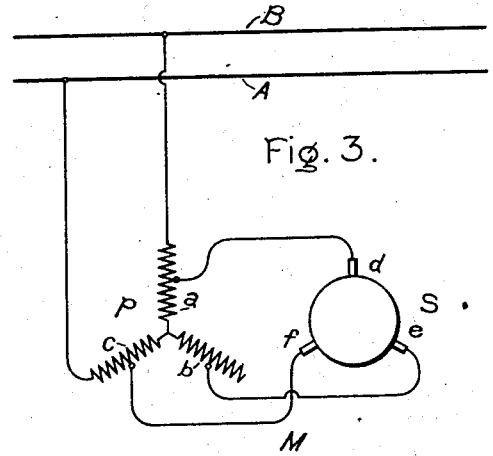
Fig. 3.
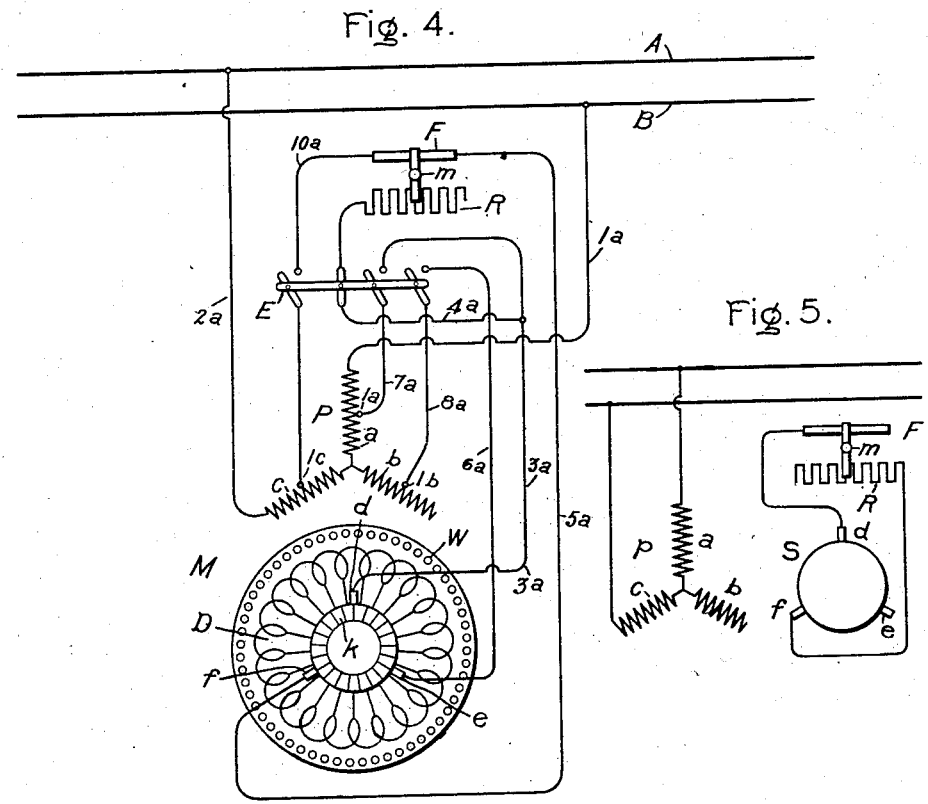
Fig. 4.
Fig. 5.
Witnesses.
George H. Tilden
Helen Orford
Inventor.
Charles P. Steinmetz.
by Albert G. Davis
Att'y.

No. 729,441. Patented May 26, 1903.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ALTERNATING-CURRENT MOTOR.

SPECIFICATION forming part of Letters Patent No. 729,441, dated May 26, 1903.

Application filed February 12, 1903. Serial No. 143,001. (No model.)

*To all whom it may concern:*

Be it known that I, CHARLES P. STEINMETZ, a citizen of the United States, residing at Schenectady, in the county of Schenectady, State of New York, have invented certain new and useful Improvements in Alternating-Current Motors, of which the following is a specification.

My present invention relates to self-starting single-phase alternating-current motors, and has for its object to so organize an alternating-current motor system that the motor may be conveniently started from a single-phase source of supply and may be operated with a high power factor.

The invention relates to that class of motors in which for purposes of regulation the secondary member is provided with a direct-current winding—that is, with a winding suitably connected to the segments of a commutator such as is used in direct-current machines—and comprises a system of control for a motor of the class above referred to, the system being so organized that the motor may be started from a single-phase source of supply and may be efficiently operated from such a source after it has been brought up to speed.

In carrying out my invention I utilize the direct-current winding for starting, placing it in such relation to the primary winding and the source of supply that a starting torque will be produced, and after the motor is running I connect the windings to the source of supply and to each other in such a manner that the most efficient operating conditions are obtained.

My invention will be better understood by reference to the following description, taken in connection with the accompanying drawings, while its scope will be pointed out in the appended claims.

In the drawings, Figure 1 is a diagram illustrating a motor of the type to which my invention relates, together with a suitable controller for connecting the motor-windings in accordance with the principles of my invention. Fig. 2 is a simplified diagram showing the connections of the motor in Fig. 1 when the controller is in its first operative position. Fig. 3 is a simplified diagram showing the connections of the motor in Fig. 1 when the controller is in the final running position. Fig. 4 is a diagram illustrating another embodiment of my invention, in which the starting connections are different from those shown in Fig. 1; and Fig. 5 is a simplified diagram showing the starting connections for the system illustrated in Fig. 4.

Referring first to Figs. 1, 2, and 3, M indicates an alternating-current motor, the primary member of which is provided with a winding P, shown as a three-phase star-connected winding comprising the sections $a$, $b$, and $c$. The secondary member S is provided with the usual squirrel-cage or other short-circuited winding W, and also with a winding D of the direct-current type connected to the segments of a commutator $k$, upon which bear three brushes $d$, $e$, and $f$, displaced by one hundred and twenty degrees from each other and arranged with relation to the poles of the primary member in a manner which will be explained later. For convenience in illustration the winding D is indicated as a ring-winding. In practice a drum-winding is preferably employed, and this winding should be placed beneath the conductors of the squirrel-cage winding. In order to control the flow of current at the moment of starting, a resistance R is provided.

For controlling the connections of the motor-windings a switch C is provided, which may be of any desired type. The particular controlling-switch illustrated in the drawings is of the controller type, having a cylinder carrying movable contacts arranged to engage with a series of fixed contacts or brushes as the cylinder is rotated. The drawings show a development of the fixed and movable contacts of the controlling-switch, the fixed contacts being represented by the small circles 6 to 18, and the movable contacts by rectangles, which are electrically interconnected, as indicated by the lines joining the contacts on the drawings. The operative positions of the fixed contacts on the rectangular movable contacts are indicated by the lines 1 1 to 5 5. A B represent the mains of a single-phase source of supply.

As shown, the controller C is in its "off" position and the circuit through the motor-windings is broken at the controller-contacts.

If now the controller be moved into its first operative position, where the fixed contacts 6 to 18 lie along line 1 1, a circuit may be traced as follows: Starting from the supply-main B the circuit leads through fixed contacts 6 and 7 and the corresponding movable contacts to conductor $7^a$, thence through resistance R to conductor $11^a$, through fixed contacts 11 and 12 and the coöperating movable contacts to conductor $12^a$, thence by way of brushes $d$ and $e$ through the direct-current winding on the secondary member of the motor M to conductor $14^a$, through fixed contacts 14 and 16 and the corresponding movable contacts to conductor $16^a$, and thence through sections $a$ and $c$ of the primary winding P and conductor $19^a$ to the other supply-main A. The connections for this position of the controller are illustrated by a simple diagram in Fig. 2. This is the first or starting position of the motor-controller and, as will be seen from an inspection of the diagram of Fig. 2, the connections are such that the motor will start as an alternating-current motor of the direct-current type, the flow of current through the motor-windings being controlled by means of the resistance R. The successive positions of the controller (indicated by the vertical lines 2 2 to 4 4, inclusive) operate merely to cut out sections of the resistance R, so that in the position of the controller-contacts (indicated by the vertical line 4 4) this resistance is cut out of circuit.

Now if the controller is moved into the final running position, where the fixed contacts lie along the line 5 5, circuits may be traced as follows: Starting from the supply-main B, a circuit leads through fixed contacts 6, 10, 11, and 16 and through the corresponding movable contacts to conductor $16^a$, and thence through the sections $a$ and $c$ of the primary winding P to the conductor $19^a$, which is directly connected to the supply-main A. Also in this position of the controller the points $1^a$, $1^b$, and $1^c$ in the primary winding are connected directly to the commutator-brushes $d$, $e$, and $f$ on the secondary member, these connections being completed through fixed contacts 12 to 15 and 17 and 18 and the corresponding movable contacts in a manner which will be evident from an inspection of the circuit connections in Fig. 1. The circuit connections established in this the final running position of the controller C are indicated by a simple diagram in Fig. 3 of the drawings, from which it will be seen that two of the terminals of the three-phase primary winding are connected directly to the single-phase supply-mains and that the commutator-brushes are each connected to an intermediate point in one of the three-phase windings on the primary member.

With the connection shown in Fig. 3 of the drawings if the commutator-brushes $d$, $e$, and $f$ are properly positioned with reference to the poles of the primary member the motor may be operated at a very high power factor, the magnetizing-current for the motor being supplied through the direct-current winding on the secondary member in a manner now well understood. The voltage necessary to be impressed upon the direct-current winding in order to produce the desired magnetizing-current is in general less than the voltage of the source of supply and may evidently be adjusted to any desired value by properly positioning the points of connection $1^a$, $1^b$, and $1^c$ in the primary winding.

In Fig. 4 I have illustrated another embodiment of my invention, in which the connections for starting are so arranged that the motor will be started as a repulsion-motor instead of as a motor of the direct-current type, as indicated in Figs. 1 and 2. In this figure also I have shown in place of the controller C of Fig. 1 a simple double-throw switch, which in one of its positions completes the necessary circuit connections for starting the motor and in its other position completes the connections for running. The resistance R is in this figure controlled by means of a separate switch F.

With the switch in the position shown in the drawings circuits may be traced as follows: Starting from the supply-conductor B a circuit leads through the conductor $1^a$ and through the sections $a$ and $c$ of the primary winding P to the other supply-main A. Also starting from the brush $f$ a circuit may be traced through the switch F and the resistance R to one of the members of the switch E, and thence through conductors $4^a$ and $3^a$ to the brush $d$. With the switch E in the position shown, therefore, two of the terminals of the primary winding are connected to the single-phase source of supply and the direct-current winding on the secondary member is short-circuited through two of the commutator-brushes and all or a portion of the resistance R in such a manner that the motor will start as a repulsion-motor. If after the motor has been started the switch E is moved into its other operative position, the resistance R will be cut out of circuit and each of the three commutator-brushes will be connected to one of the intermediate points $1^a$, $1^b$, and $1^c$ in the primary winding of the motor, the connections for the primary winding remaining as before.

In lieu of connecting the commutator-brushes to intermediate points in a single primary winding I may of course wind the portion to which the brushes are connected as a separate winding in inductive relation to the main winding P. Other changes in the connections may evidently be made without affecting the operation of the system, and I aim in the claims hereto appended to cover all modifications which do not involve a departure from the spirit and scope of my invention.

What I claim as new, and desire to secure by Letters Patent of the United States, is—

1. The combination with an induction-motor having its primary member provided with a multiphase winding and its secondary member with a short-circuited winding and with a winding of the direct-current type, of means for connecting the motor-windings to a single-phase source of supply in such a manner that a starting torque will be produced.

2. The combination with an induction-motor having its primary member provided with a multiphase winding and its secondary member with a short-circuited winding and with a winding of the direct-current type, of means for connecting the multiphase winding to a single-phase source of supply and for connecting the direct-current winding in such relation with respect thereto that a starting torque will be produced.

3. The combination with an induction-motor having its primary member provided with a multiphase winding and its secondary member with a short-circuited winding and with a winding of the direct-current type, of a controlling-switch having its contacts constructed and arranged to first connect the multiphase winding to a single-phase source of supply and the direct-current winding in such relation with respect thereto that a starting torque will be produced and thereafter to connect the multiphase winding to the single-phase source and the direct-current winding to suitable points in the said multiphase winding.

4. The combination with an induction-motor having its primary member provided with a multiphase winding and its secondary member with a short-circuited winding and with a winding of the direct-current type connected through its commutator to brushes so positioned that the magnetizing-current for the motor may be supplied through the last winding in such a manner as to increase the power factor of the motor, of a controlling-switch having its contacts constructed and arranged to first connect the multiphase winding to a single-phase source of supply and to connect the direct-current winding in such relation with respect thereto that a starting torque will be produced and thereafter to connect the multiphase winding to the single-phase source and the commutator-brushes to suitable points in the multiphase winding on the primary member.

5. The combination with an induction-motor having its primary member provided with a three-phase winding and its secondary member with a short-circuited winding and with a winding of the direct-current type connected through its commutator to brushes so positioned that the magnetizing-current for the motor may be supplied through the last winding in such manner as to increase the power factor of the motor, of a controlling-switch having its contacts so constructed and arranged that in one position two of the terminals of the three-phase primary winding will be connected to the single-phase source of supply and the direct-current winding will be connected in such relation with respect to the three-phase primary winding that a starting torque will be produced and in another position so that two of the terminals of the three-phase winding will be connected to the single-phase source of supply and the commutator-brushes to suitable points in the winding on the primary member.

In witness whereof I have hereunto set my hand this 11th day of February, 1903.

CHARLES P. STEINMETZ.

Witnesses:
BENJAMIN B. HULL,
HELEN ORFORD.